(12) United States Patent
Kim et al.

(10) Patent No.: US 10,100,884 B2
(45) Date of Patent: Oct. 16, 2018

(54) CLUTCH CONTROL METHOD AND CLUTCH CONTROL FILTER FOR VEHICLE

(71) Applicant: Hyundai Motor Company, Seoul (KR)

(72) Inventors: Jin Sung Kim, Hwaseong-si (KR); Ju Hyun Nam, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 190 days.

(21) Appl. No.: 15/331,255

(22) Filed: Oct. 21, 2016

(65) Prior Publication Data

US 2017/0335903 A1    Nov. 23, 2017

(30) Foreign Application Priority Data

May 20, 2016    (KR) .................. 10-2016-0062269

(51) Int. Cl.
*F16D 48/06*    (2006.01)
*B60W 30/20*    (2006.01)
*B60W 10/02*    (2006.01)

(52) U.S. Cl.
CPC .............. *F16D 48/06* (2013.01); *B60W 10/02* (2013.01); *B60W 2030/203* (2013.01);
(Continued)

(58) Field of Classification Search
CPC ..... Y10T 477/75; Y10T 477/78; F16D 78/06; F16D 2500/70252; F16D 2500/50287;
(Continued)

(56) References Cited

U.S. PATENT DOCUMENTS

| | | | |
|---|---|---|---|
| 6,450,921 B1 * | 9/2002 | Glab ................. | B60K 23/0808 477/174 |
| 7,151,991 B2 * | 12/2006 | Iida .................... | B60K 23/0808 701/69 |

(Continued)

FOREIGN PATENT DOCUMENTS

| | | |
|---|---|---|
| JP | 3134901 B2 | 2/2001 |
| JP | 2003-278806 A | 10/2003 |

(Continued)

OTHER PUBLICATIONS

Notice of Allowance dated Feb. 8, 2018 from the corresponding Korean Application No. 10-2016-0062269, 2 pp.

*Primary Examiner* — Roger L Pang
(74) *Attorney, Agent, or Firm* — Brinks Gilson & Lione (57) ABSTRACT

The present disclosure provides a clutch control method, including: a variation setting step of setting, by a controller, a current torque variation depending on a difference between a just previous clutch control torque and a clutch target torque; a limit determining step of determining whether a jerk of a clutch control torque need not be limited when the clutch control torque is reduced and then is increased or when the clutch control torque is continuously reduced by using the current torque variation and a just previous torque variation; a direction setting step and a limit setting step to determine a final torque variation based on the outcome of the limit determining step; and a control torque calculating step of calculating the clutch control torque to control a clutch.

8 Claims, 6 Drawing Sheets

(52) U.S. Cl.
CPC ............ *F16D 2500/10412* (2013.01); *F16D 2500/304* (2013.01); *F16D 2500/50287* (2013.01); *F16D 2500/70252* (2013.01); *Y10T 477/75* (2015.01); *Y10T 477/78* (2015.01)

(58) Field of Classification Search
CPC ............ F16D 2500/304; B60W 10/02; B60W 2030/203
USPC .................................................... 701/75, 78
See application file for complete search history.

(56) References Cited

U.S. PATENT DOCUMENTS

| | | | | |
|---|---|---|---|---|
| 8,332,111 B2 * | 12/2012 | McDonnell | ........... | B60W 10/02 |
| | | | | 701/68 |
| 8,480,540 B2 * | 7/2013 | Reibold | ................. | F16D 48/06 |
| | | | | 477/180 |
| 8,626,411 B2 * | 1/2014 | Whitney | ............... | B60W 30/20 |
| | | | | 701/51 |
| 9,829,411 B2 * | 11/2017 | Fujii | .................... | F16H 61/061 |

FOREIGN PATENT DOCUMENTS

| | | |
|---|---|---|
| JP | 4435118 B2 | 3/2010 |
| KR | 10-2004-0021872 A | 3/2004 |
| KR | 10-2011-0049934 A | 5/2011 |
| KR | 10-2012-0048960 A | 5/2012 |
| KR | 10-1393909 B1 | 5/2014 |
| KR | 10-2015-0125065 A | 11/2015 |

* cited by examiner

CLUTCH CONTROL METHOD AND CLUTCH CONTROL FILTER FOR VEHICLE

CROSS REFERENCE TO RELATED APPLICATION

The present application claims priority to and the benefit of Korean Patent Application No. 10-2016-0062269, filed on May 20, 2016, which is incorporated by reference in its entirety.

FIELD

The present disclosure relates to a clutch control method and a clutch control filter for a vehicle.

BACKGROUND

The statements in this section merely provide background information related to the present disclosure and may not constitute prior art.

In a vehicle in which an automated manual transmission (AMT) or a dual clutch transmission (DCT) as a transmission is mounted and power sources such as an engine and a motor transfer power to the transmission through the dry clutch, a control of the dry clutch is an important factor having a significant effect on drivability of the vehicle.

In particular, unlike the existing torque converter, the dry clutch itself does not have a damping function, and therefore a shock is highly likely to be generated upon engagement and disengagement of the clutch. As a result, the proper clutch control becomes an important factor for smooth launching or shifting of a vehicle.

For reference, unless mentioned separately, the term clutch herein refers to the dry clutch forming a dual clutch of the DCT or a clutch of the AMT.

The term clutch control substantially refers to a control of a clutch torque, i.e. a torque transferred by the clutch. Basically, the sudden change in the clutch torque (also referred to as 'jerk') is a main cause of causing the shock of the clutch, and therefore the control of the clutch is performed to avoid the sudden change in the clutch torque. To this end, a clutch control torque directly used to control a clutch actuator actually controlling the clutch is processed so that the clutch control torque is smoothly changed.

That is, a curved line drawn by the clutch control torque over time preferably forms a smooth profile.

For this reason, for the existing clutch control, a filter is configured to limit a variation of the clutch control torque per control unit time, and to limit even a change in jerk that is a differential value of the variation of the clutch control torque, and therefore even the change in the clutch control torque may form the smooth profile. In detail, the jerk of the clutch control torque is uniformly limited to a predetermined level to suppress the clutch control torque from being suddenly changed.

Figure 1:
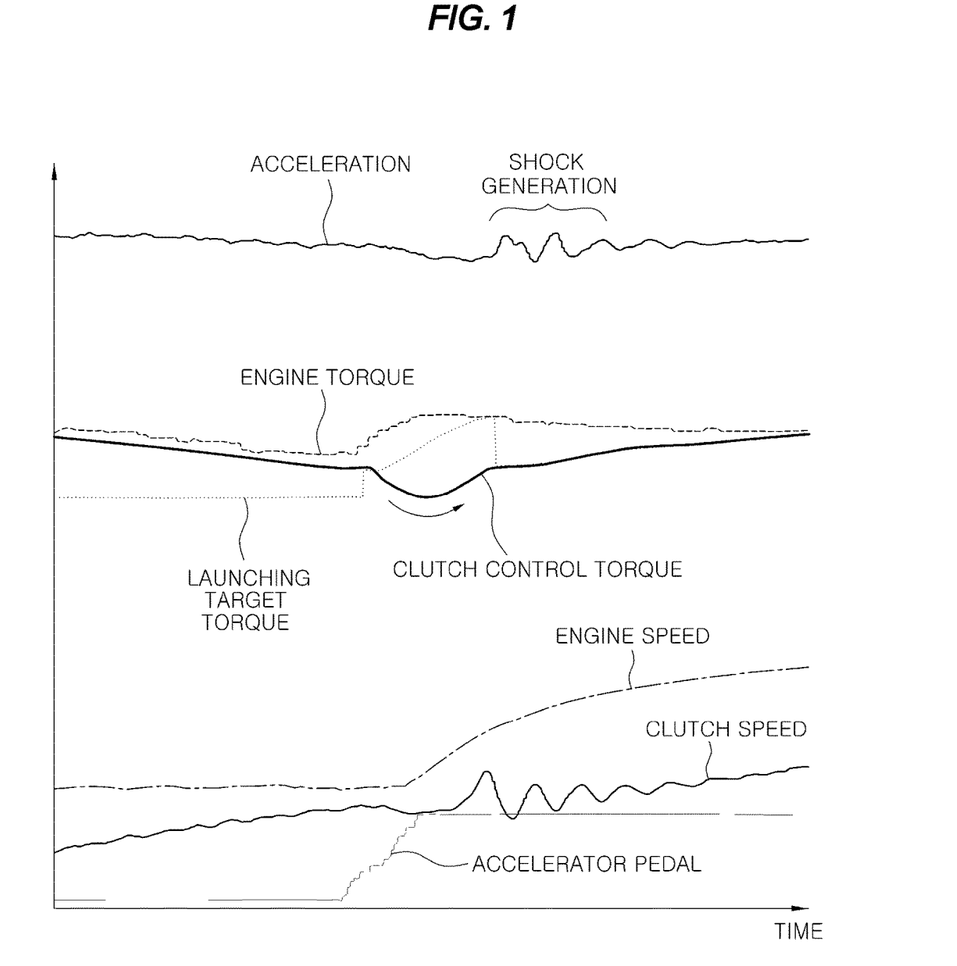
FIG. 1 is a diagram illustrating a process for changing a creep driving state of a vehicle to a launching state by pressing, by a driver, an accelerator pedal, according to the related art.

FIG. 1 illustrates the existing process of changing a creep driving state of a vehicle to a launching state by pressing, by a driver, an accelerator pedal and illustrates a process of controlling a clutch to set a launching target torque that is a clutch target torque by slightly reducing a clutch torque to induce a smooth increase in an engine speed and then increasing the clutch torque to launch a vehicle depending on an operation of the accelerator pedal by a driver and follow up the set launching target torque.

The launching target torque is calculated to a degree desired to smoothly launch a vehicle depending on the manipulated quantity of the accelerator pedal by driver. As such, if the clutch control is performed based on the launching target torque calculated in consideration of only the launching condition of the vehicle, a shock is highly likely to be applied to the vehicle due to the sudden change in the clutch torque. Therefore, the clutch control torque as illustrated is calculated by performing the filtering to limit the jerk of the launching target torque, and as a result the clutch actuator is substantially operated depending on the clutch control torque.

In this case, in the process of slightly reducing the launching target torque and then increasing the launching target torque again to induce the smooth increase in the engine speed, if the launching target torque is filtered, the jerk of the clutch control torque is limited to a predetermined level, and thus the filtered clutch control torque is reduced in response to the launching target torque and then is not suddenly increased in response to the launching target torque but is changed to be increased with the profile drawing the smooth curved line as illustrated by an arrow. In this case, we have found that, although the profile of the clutch control torque is smoothly changed, the clutch control torque actually controlling the clutch does not properly follow up the launching target torque that is a control target and therefore a shock is generated, which may be appreciated from FIG. 1 that the vibration of the accelerator sensor signal is generated.

The contents described as the related art have been provided only for assisting in the understanding for the background of the present disclosure and should not be considered as corresponding to the related art known to those skilled in the art.

SUMMARY

The present disclosure provides a clutch control method and a clutch control filter for a vehicle, capable of inhibiting or preventing a shock of a clutch from being generated under the situation that a clutch torque is suddenly changed due to launching, shifting, or the like of the vehicle by properly filtering a clutch target torque determined to control the clutch according to a driving condition of the vehicle to be a clutch control torque actually used for a control of the clutch to thereby secure excellent driving characteristics of the vehicle, in the vehicle configured to use a dry clutch to transfer power from power sources such as an engine and a motor to a transmission.

According to one exemplary form of the present disclosure, there is provided a clutch control method, including: a variation setting step of setting, by a controller, a current torque variation depending on a difference between a just previous clutch control torque and a clutch target torque; a limit determining step of determining whether a jerk of a clutch control torque need not be limited when the clutch control torque is reduced and then is increased or when the clutch control torque is continuously reduced by using the current torque variation and the just previous torque variation; when the jerk of the clutch control torque need not be limited, a direction setting step of determining, by the controller, the current torque variation set in the variation setting step as the final torque variation; when the jerk of the clutch control torque needs to be limited, a limit setting step of determining the current torque variation as the final torque variation by limiting, by the controller, the current torque variation to an upper bound of the jerk that is a limit in which the variation of the clutch control torque is increased and a lower bound of the jerk that is a limit in which the variation of the clutch control torque is reduced; and a control torque calculating step of calculating a clutch control torque to control the clutch by adding, by the controller, the final torque variation to the just previous clutch control torque.

In the limit determining step, when the current torque variation is larger than 0 and the just previous torque variation is equal to or less than 0, the controller determines that the clutch control torque is reduced and then increased and when the current torque variation is equal to or less than 0, and the controller determines that the clutch control torque is continuously reduced.

In the limit setting step, the upper bound of the jerk may be smaller than the lower bound of the jerk.

The limit setting step may include: a minimum value selecting process of selecting a minimum value by comparing the current torque variation with a value obtained by adding the upper bound of the jerk to the just previous torque variation; and a maximum value selecting process of selecting a maximum value by comparing a value obtained by subtracting the lower bound of the jerk from the just previous torque variation with the minimum value selected in the minimum value selecting process, in which the maximum value selected in the maximum value selecting process may become the final torque variation According to another exemplary form of the present disclosure, there is provided a clutch control filter for a vehicle, including: a variation setting map having information of a current torque variation depending on a difference between a just previous clutch control torque and a clutch target torque; a limit determining unit configured to receive the current torque variation and the just previous torque variation to determine whether a jerk of a clutch control torque need not be limited when the clutch control torque is reduced and then is increased or when the clutch control torque is continuously reduced; a direction setting unit configured to determine the current torque variation from the variation setting map as a final torque variation, if it is determined by the limit determining unit that the jerk of the clutch control torque need not be limited; a limit setting unit configured to determine the current torque variation as the final torque variation by limiting the current torque variation to an upper bound of the jerk that is a limit in which the variation of the clutch control torque is increased and a lower bound of the jerk that is a limit in which the variation of the clutch control torque is reduced, if it is determined by the limit determining unit that the jerk of the clutch control torque needs to be limited; and a control torque calculation unit configured to calculate the clutch control torque for controlling the clutch by adding the final torque variation to the just previous clutch control torque.

The limit determining unit may determine that the clutch control torque is reduced and then increased when the current torque variation is larger than 0 and the just previous torque variation is equal to or less than 0 and may determine that the clutch control torque is continuously reduced when the current torque variation is equal to or less than 0.

The upper bound of the jerk of the limit setting unit may be set to be smaller than the lower bound of the jerk.

The limit setting unit may include: a minimum value selection unit configured to select a minimum value by comparing the current torque variation with a value obtained by adding the upper bound of the jerk to the just previous torque variation; and a maximum value selection unit configured to select a maximum value by comparing a value obtained by subtracting the lower bound of the jerk from the just previous torque variation with the minimum value selected in the minimum value selection unit, in which the maximum value selected in the maximum value selection unit may become the final torque variation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
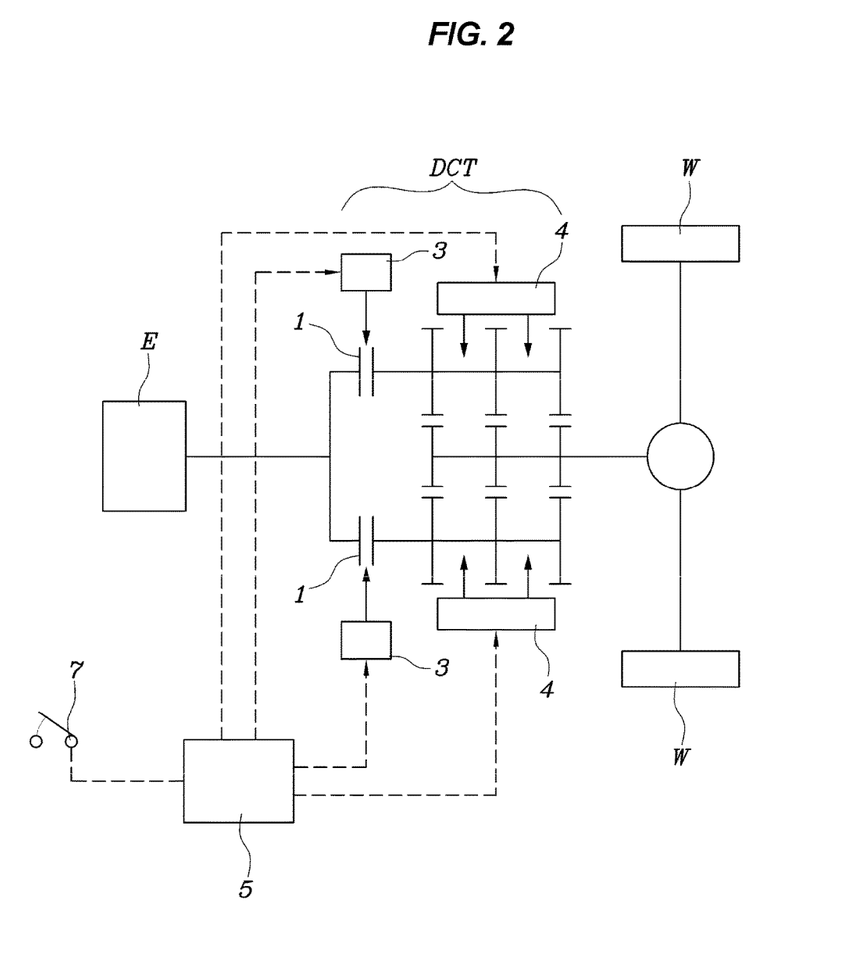
FIG. 2 is a diagram illustrating a power train of a vehicle with a DCT to which the present disclosure may be applied.

FIG. 2 is a diagram illustrating a power train of a vehicle to which the present disclosure may be applied, in which the power train is configured to provide power from an engine E to a driving wheel W through a dual clutch transmission (DCT), two clutches 1 configuring the DCT are each controlled by a clutch actuator 3, shift gears configuring each shift stage perform shifting by a shift actuator 4 selecting and driving synchronous apparatuses, the clutch actuator 3 and the shift actuator 4 are controlled by a controller 5, and the controller is configured to receive an accelerator position sensor (APS) 7 signal to receive a manipulated quantity of an accelerator pedal.

In addition to this, the controller 5 is configured to receive information such as an engine torque and an engine speed.

Figure 3:
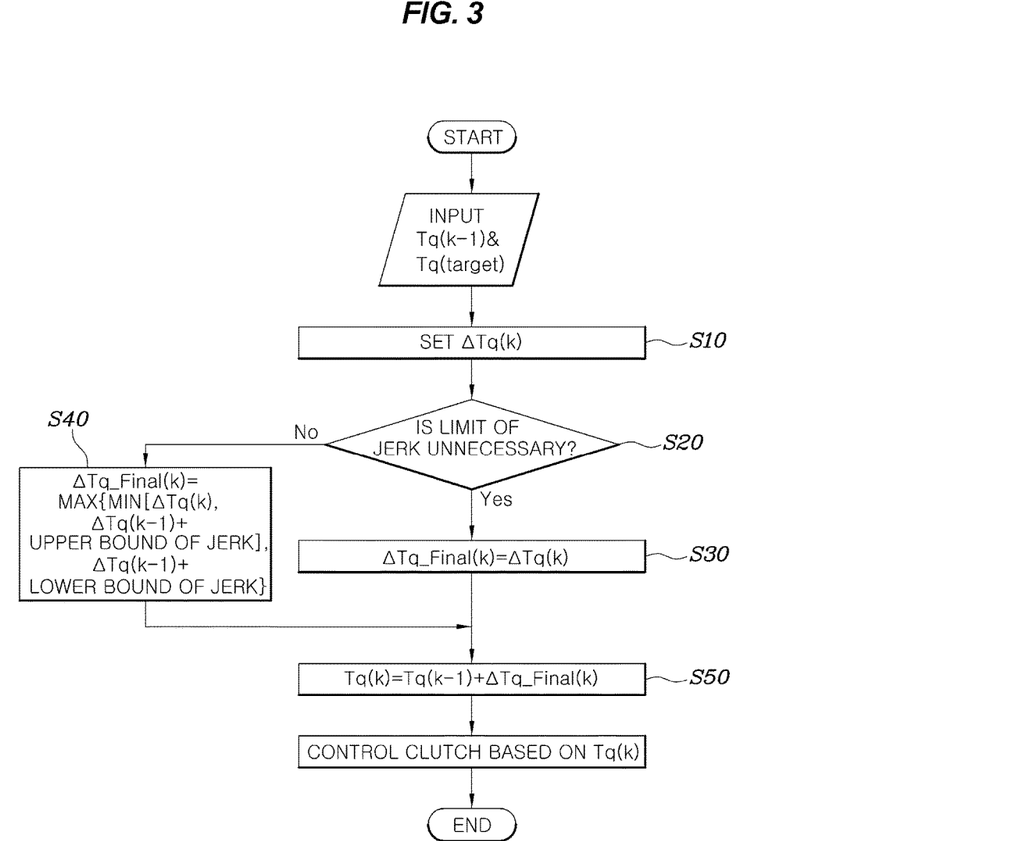
FIG. 3 is a flow chart illustrating a clutch control method for a vehicle according to one exemplary form of the present disclosure.

Referring to FIG. 3, a clutch control method according to an exemplary form of the present disclosure includes: a variation setting step (S10) of setting, by the controller 5, a current torque variation $\Delta Tq(k)$ depending on a difference between a just previous clutch control torque $Tq(k-1)$ and a clutch target torque $Tq(target)$; a limit determining step (S20) of determining, by the controller 5, whether a jerk of a clutch control torque need not be limited when a clutch control torque is reduced and then is increased or when a clutch control torque is continuously reduced by using the current torque variation ΔTq(k) and the just previous torque variation ΔTq(k−1); when the jerk of the clutch control torque need not be limited in the limit determining step (S20), a direction setting step (S30) of determining the current torque variation ΔTq(k) set in the variation setting step (S10) as the final torque variation ΔTq_Final(k); when the limit determining step (S20) determines that the jerk of the clutch control torque needs to be limited, a limit setting step (S40) of determining the current torque variation ΔTq (k) as the final torque variation ΔTq_Final(k) by limiting, by the controller 5, the current torque variation ΔTq(k) to an upper bound of the jerk that is a limit in which the variation of the clutch control torque may be increased and a lower bound of the jerk that is a limit in which the variation of the clutch control torque may be reduced; and a control torque calculating step (S50) of calculating a clutch control torque Tq(k) to control the clutch by adding, by the controller 5, the final torque variation ΔTq_Final(k) to the just previous clutch control torque Tq(k−1).

Further, the controller 5 controls the clutch actuator 3 based on the clutch control torque Tq(k) calculated in the control torque calculating step S50.

For reference, the controller 5 works according to control cycles like ~k−1, k, k+1~repeatedly.

In the variation setting step (S10), the just previous clutch control torque Tq(k−1) means the clutch control torque calculated in the control torque calculating step (S50) of the just previous control cycle (k−1) when a series of steps configured as described above are repeatedly performed and may first set to be the same value as the clutch target torque, or the like and may also be set to be any set value determined in design by a plurality of experiments and analyses.

The clutch control torque Tq(k) is a value to be used to actually control the clutch and the controller 5 substantially drives the clutch actuator to form the clutch control torque Tq(k) calculated in the control torque calculating step (S50) to form a transfer torque of the corresponding clutch.

The clutch target torque Tq(target) is a value calculated by the controller 5 based on the torque to be transferred by the clutch according to the driving condition of the vehicle in consideration of the engine torque, the manipulation of the driver, or the like and a method of calculating the clutch target torque Tq(target) may use the known technology of the related art.

According to the present exemplary form, in the variation setting step (S10), by using a variation setting map having information of the current torque variation ΔTq(k) depending on the difference between the just previous clutch control torque Tq(k−1) and the clutch target torque Tq(target), the difference between the just previous clutch control torque Tq(k−1) and the clutch target torque Tq(target) is input to the variation setting map to obtain the current torque variation ΔTq(k).

In the limit determining step (S20), when the current torque variation ΔTq(k) is larger than 0 and the just previous torque variation ΔTq(k−1) is equal to or less than 0, it is determined that the clutch control torque is reduced and then increased, and when the current torque variation ΔTq(k) is equal to or less than 0, it is determined that the clutch control torque is continuously reduced, thereby determining that the jerk of the clutch control torque need not be limited.

That is, as described above, since the case in which the clutch control torque is reduced and then increased corresponds to the case in which the clutch control torque needs to be rapidly increased under the situations such as the vehicle launching, in this case, the variation of the clutch control torque as desired to follow up the clutch target torque is reflected as it is without limiting the jerk of the clutch control torque to more faithfully follow up the clutch target torque, thereby improving responsiveness of the vehicle and the control followability and preventing or inhibiting a shock from being unexpectedly generated, or the like.

Figure 5:
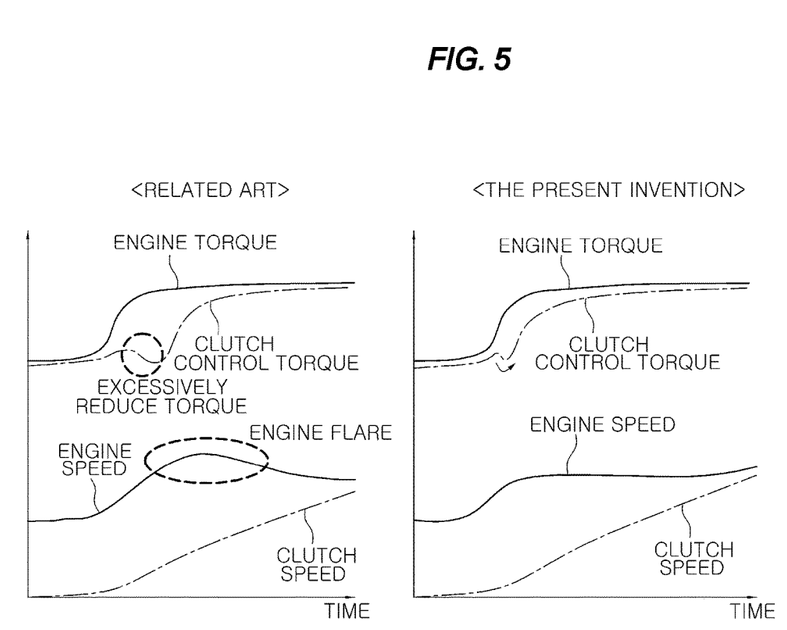
FIG. 5 is a comparison diagram of an effect of the present disclosure with that of the related art.

FIG. 5 is a comparison diagram of the situations as described above. FIG. 5 describes that in the case of the related art, a relatively longer time is desired until the clutch control torque is reduced and then increased and the reduced amount of the clutch control torque is large, such that a flare phenomenon of excessively increasing the engine speed happens. On the contrary, in the case of the present disclosure, the time desired to reduce the clutch control torque and then increase the clutch control torque is a lot shorter, and therefore the engine flare phenomenon is inhibited or prevented.

Further, in the limit determining step (S20), it is determined that the jerk of the clutch control torque need not be limited when the clutch control torque is continuously reduced. Accordingly, in controlling the clutch, the clutch is engaged relatively slowly on the whole to inhibit or prevent a shock but the clutch should be able to be possibly rapidly disengaged in some cases to cope with emergency situations such as an engine stall, such that the clutch control torque may faithfully follow up the clutch target torque set in the situations.

Therefore, according to the present disclosure, at the moment that the clutch control torque needs to be reduced and then suddenly increased and under the situation that the clutch control torque needs to be continuously suddenly reduced, the clutch control torque faithfully follow up the clutch target torque so that the responsiveness of the vehicle is improved, the generation of the shock is inhibited or prevented, the engine stall is inhibited or prevented, or the like, thereby improving the stability of the vehicle.

Meanwhile, as described above, as a result of performing the limit determining step (S20), when the jerk of the clutch control torque needs to be limited, in the limit setting step (S40) is performed to inhibit or prevent the variation of the clutch control torque for following up the clutch target torque from being suddenly changed, that is, limit the jerk of the clutch control torque to a predetermined level.

The limit setting step (S40) includes a minimum value selecting process of selecting a minimum value by comparing the current torque variation with a value obtained by adding the upper bound of the jerk to the just previous torque variation and a maximum value selecting process of selecting a maximum value by comparing a value obtained by subtracting the lower bound of the jerk from the just previous torque variation with the minimum value selected in the minimum value selecting process, in which the maximum value selected in the maximum value selecting process becomes the final torque variation ΔTq_Final(k).

Therefore, by the limit setting step (S40), the final torque variation may not be a value increased over the upper bound of the jerk and a value reduced over the lower bound of the jerk compared to the former control cycle, and therefore is a value between the upper bound of the jerk and the lower bound of the jerk or is limited to the upper bound of the jerk or the lower bound of the jerk, thereby inhibiting or preventing the clutch control torque from being suddenly changed.

In the limit setting step (S40), the upper bound of the jerk is set to be smaller than the lower bound of the jerk.

Therefore, the clutch control torque may be relatively suddenly reduced but relatively slowly increased to more properly cope with the situations such as the engine stall as described above.

The upper bound of the jerk and the lower bound of the jerk may be determined in design based on the plurality of experiments and analyses according to a vehicle model.

Figure 4:
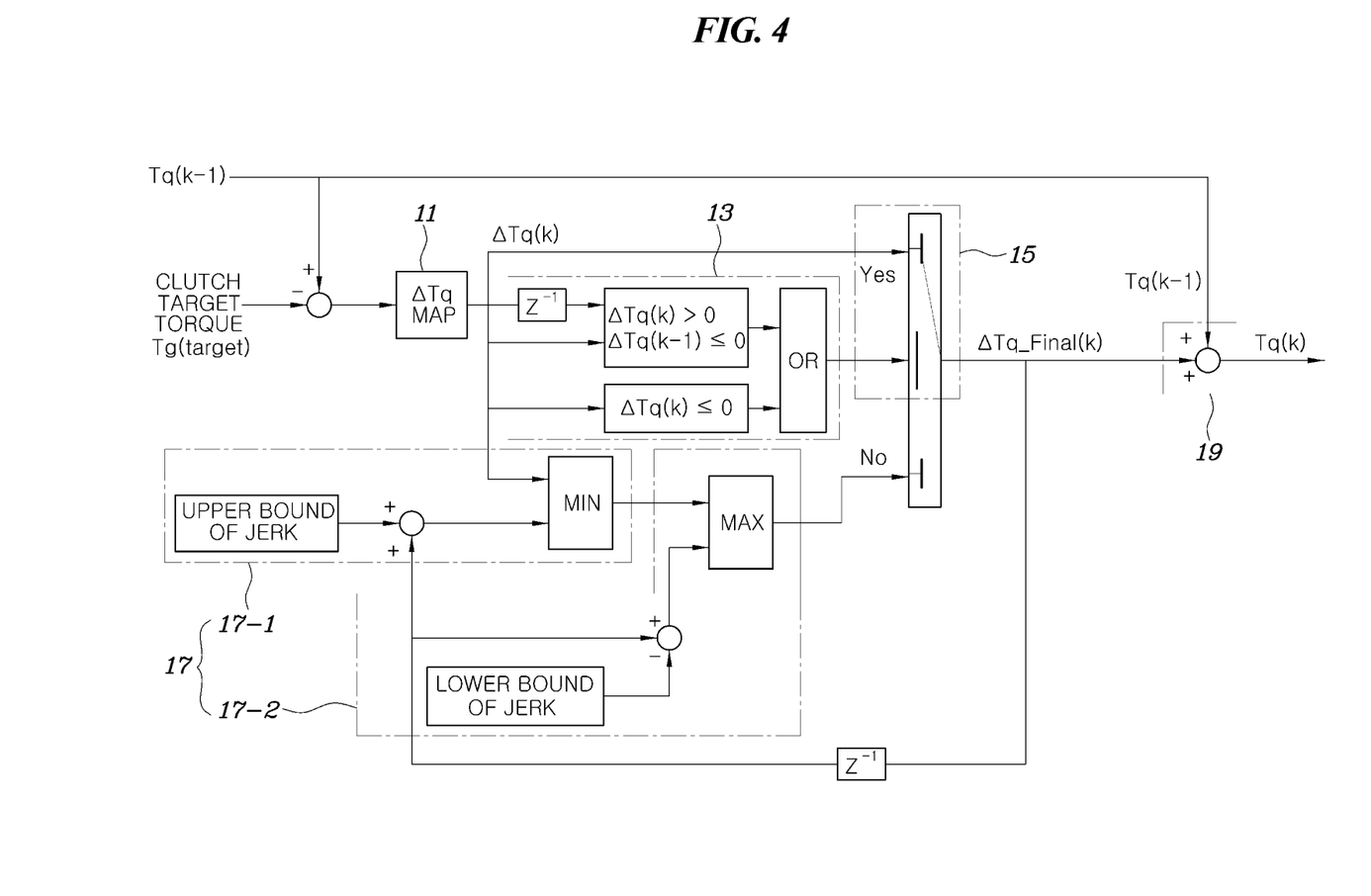
FIG. 4 is a block diagram illustrating a clutch control filter for a vehicle according to one form of the present disclosure.

FIG. 4 is a configuration diagram of a clutch control filter for a vehicle according to one exemplary form of the present disclosure, in which the clutch control filter includes: a variation setting map 11 having information of a current torque variation depending on a difference between a just previous clutch control torque and a clutch target torque; a limit determining unit 13 configured to receive the current torque variation and the just previous torque variation to determine whether a jerk of a clutch control torque need not be limited as a case in which the clutch control torque is reduced and then is increased or as a case in which the clutch control torque is continuously reduced; a direction setting unit 15 configured to determine the current torque variation from the variation setting map 11 as a final torque variation if it is determined by the limit determining unit 13 that the jerk of the clutch control torque need not be limited; a limit setting unit 17 configured to determine the current torque variation as the final torque variation by limiting the current torque variation to an upper bound of the jerk that is a limit in which the variation of the clutch control torque may be increased and a lower bound of the jerk that is a limit in which the variation of the clutch control torque may be reduced, if it is determined by the limit determining unit 13 that the jerk of the clutch control torque needs to be limited; and a control torque calculation unit 19 configured to calculate the clutch control torque for controlling the clutch by adding the final torque variation to the just previous clutch control torque.

For reference, in FIG. 4, $Z^{-1}$ means a unit delay providing the corresponding value at the previous control cycle.

The limit determining unit 13 determines that the clutch control torque is reduced and then increased when the current torque variation is larger than 0 and the just previous torque variation is equal to or less than 0. And the limit determining unit 13 determines that the clutch control torque is continuously reduced when the current torque variation is equal to or less than 0.

The upper bound of the jerk of the limit setting unit 17 is set to be a smaller value than the lower bound of the jerk.

The limit setting unit 17 includes: a minimum value selection unit 17-1 configured to select a minimum value by comparing the current torque variation with a value obtained by adding the upper bound of the jerk to the just previous torque variation, and a maximum value selection unit 17-2 configured to select a maximum value by comparing a value obtained by subtracting the lower bound of the jerk from the just previous torque variation with the minimum value selected in the minimum value selection unit 17-1, in which the maximum value selected in the maximum value selection unit 17-2 becomes the final torque variation.

Figure 6:
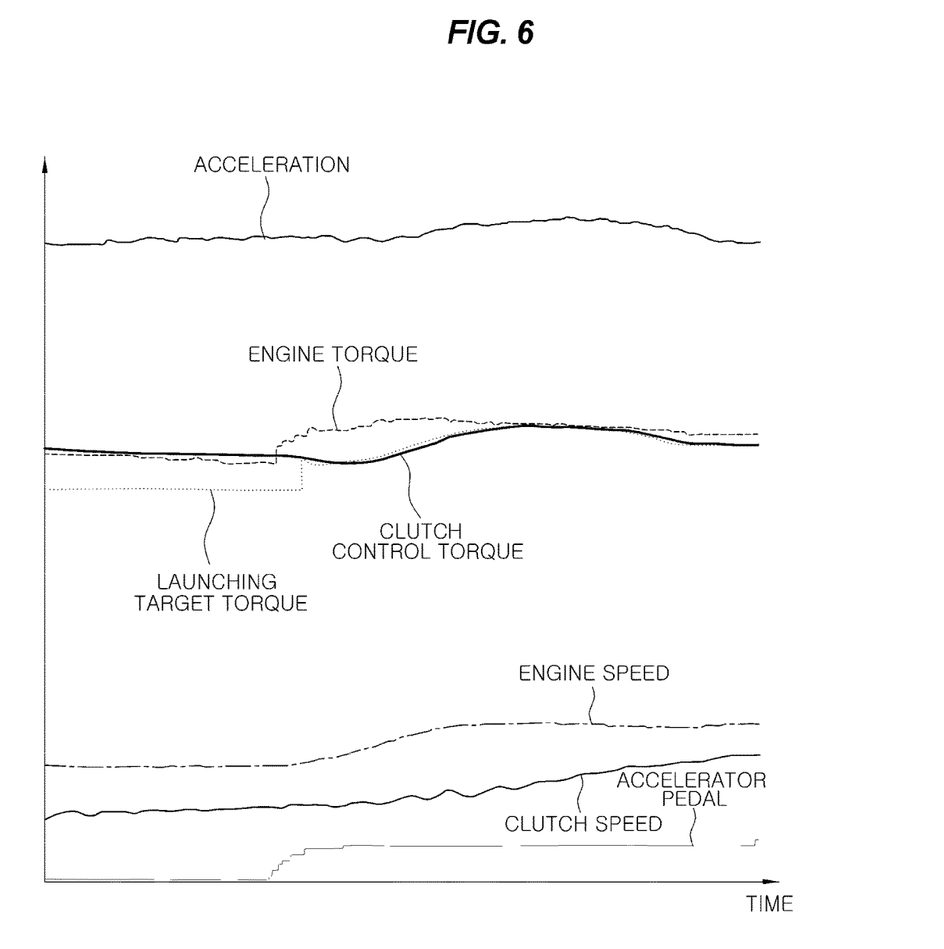
FIG. 6 is a graph illustrating the effect obtained by applying the present disclosure to the process of changing a creep driving state of a vehicle to a launching state by pressing, by a driver, an accelerator pedal.

FIG. 6 is a diagram illustrating the results obtained by the application of the present disclosure under the situation that the vehicle is launched like FIG. 1. By the application of the present disclosure, when the vehicle is launched by the manipulation of the accelerator pedal by the driver during the creep driving of the vehicle, the clutch control torque very faithfully follows up the launching target torque that is the clutch target torque calculated to perform the smooth launching control according to the manipulation of the accelerator pedal to show the situation that the vehicle is launched to thereby perform the clutch control suitable for the driving condition of the vehicle, thereby improving the responsiveness of the vehicle, in particular, inhibiting or preventing the shock from being unexpectedly generated due to the control mismatch.

According to the exemplary forms of the present disclosure, it is possible to inhibit or prevent the shock of the clutch from being generated under the situation that the clutch torque is suddenly changed due to the launching, the shifting, or the like of the vehicle by properly filtering the clutch target torque determined to control the clutch according to the driving condition of the vehicle to be the clutch control torque actually used for the control of the clutch to thereby secure the excellent driving characteristics of the vehicle, in the vehicle configured to use the dry clutch to transfer power from the power sources such as the engine and the motor to the transmission.

Although the present disclosure has been shown and described with respect to specific exemplary forms, it will be obvious to those skilled in the art that the present disclosure may be variously modified and altered without departing from the spirit and scope of the present disclosure.

What is claimed is:

1. A clutch control method, comprising:
   a variation setting step of setting, by a controller, a current torque variation depending on a difference between a just previous clutch control torque and a clutch target torque;
   a limit determining step of determining, by the controller, whether a jerk of a clutch control torque need not be limited when the clutch control torque is reduced and then is increased or when the clutch control torque is continuously reduced by using the current torque variation and a just previous torque variation;
   when the jerk of the clutch control torque need not be limited as a result of performing the limit determining step, a direction setting step of determining, by the controller, the current torque variation set in the variation setting step as a final torque variation;
   when the jerk of the clutch control torque needs to be limited as a result of performing the limit determining step, a limit setting step of determining the current torque variation as the final torque variation by limiting, by the controller, the current torque variation to an upper bound of the jerk that is a limit in which a variation of the clutch control torque is increased and a lower bound of the jerk that is a limit in which the variation of the clutch control torque is reduced; and
   a control torque calculating step of calculating the clutch control torque to control a clutch by adding, by the controller, the final torque variation to the just previous clutch control torque.

2. The clutch control method of claim 1, wherein in the limit determining step, when the current torque variation is larger than 0 and the just previous torque variation is equal to or less than 0, the controller determines that the clutch control torque is reduced and then increased, and the controller determines that the clutch control torque is continuously reduced when the current torque variation is equal to or less than 0.

3. The clutch control method of claim 1, wherein in the limit setting step, the upper bound of the jerk is smaller than the lower bound of the jerk.

4. The clutch control method of claim 3, wherein the limit setting step includes:
   a minimum value selecting process of selecting a minimum value by comparing the current torque variation with a value obtained by adding the upper bound of the jerk to the just previous torque variation; and a maximum value selecting process of selecting a maximum value by comparing a value obtained by subtracting the lower bound of the jerk from the just previous torque variation with the minimum value selected in the minimum value selecting process, and wherein the maximum value selected in the maximum value selecting process becomes the final torque variation.

5. A clutch control filter for a vehicle, comprising:

a variation setting map including information of a current torque variation depending on a difference between a just previous clutch control torque and a clutch target torque;

a limit determining unit configured to receive the current torque variation and a just previous torque variation to determine whether a jerk of a clutch control torque need not be limited when the clutch control torque is reduced and then is increased or when the clutch control torque is continuously reduced;

a direction setting unit configured to determine the current torque variation from the variation setting map as a final torque variation, when the limit determining unit determines that the jerk of the clutch control torque need not be limited;

a limit setting unit configured to determine the current torque variation as the final torque variation by limiting the current torque variation to an upper bound of the jerk that is a limit in which a variation of the clutch control torque is increased and a lower bound of the jerk that is a limit in which the variation of the clutch control torque is reduced when the limit determining unit determines that the jerk of the clutch control torque needs to be limited; and a control torque calculation unit configured to calculate the clutch control torque for controlling the clutch by adding the final torque variation to the just previous clutch control torque.

6. The clutch control filter of claim 5, wherein the limit determining unit determines that the clutch control torque is reduced and then increased when the current torque variation is larger than 0 and the just previous torque variation is equal to or less than 0, and the limit determining unit determines that the clutch control torque is continuously reduced when the current torque variation is equal to or less than 0.

7. The clutch control filter of claim 5, wherein the upper bound of the jerk of the limit setting unit is set to be smaller than the lower bound of the jerk.

8. The clutch control filter of claim 7, wherein the limit setting unit includes:

a minimum value selection unit configured to select a minimum value by comparing the current torque variation with a value obtained by adding the upper bound of the jerk to the just previous torque variation; and a maximum value selection unit configured to select a maximum value by comparing a value obtained by subtracting the lower bound of the jerk from the just previous torque variation with the minimum value selected in the minimum value selection unit, and wherein the maximum value selected in the maximum value selection unit becomes the final torque variation.

* * * * *